United States Patent [19]

Lake et al.

[11] Patent Number: 5,191,670

[45] Date of Patent: Mar. 9, 1993

[54] FORK SCRUBBER

[76] Inventors: Ron W. Lake, 1550 Connoley Ave., Chula Vista, Calif. 91911; Debra Green, 1032 S. Windy Ridge Ct., Anaheim Hills, Calif. 92808

[21] Appl. No.: 815,820

[22] Filed: Dec. 30, 1991

[51] Int. Cl.$^5$ .................. A46B 3/00; A46B 9/02; A47L 21/00

[52] U.S. Cl. .................. 15/160; 15/207.2; 15/218.1

[58] Field of Search .............. 15/218.1, 160, 159 A, 15/106, 104.04, 167.3, 104.5, 104.53

[56] References Cited

U.S. PATENT DOCUMENTS

| | | | |
|---|---|---|---|
| 102,803 | 5/1870 | Gibbs | 15/104.52 |
| 485,048 | 10/1892 | Lehmann | 15/218.1 |
| 487,446 | 12/1892 | Murphy | 15/218.1 |
| 921,086 | 5/1909 | Clark . | |
| 946,370 | 1/1910 | Kelmel | 15/160 |
| 958,843 | 5/1910 | Uhlyarik . | |
| 979,660 | 12/1910 | Felder | 15/104.53 |
| 1,096,354 | 5/1914 | Coyle . | |
| 1,367,280 | 2/1921 | Reiges . | |
| 1,407,674 | 2/1922 | Roepke | 15/160 |
| 2,777,146 | 1/1957 | McDonald | 15/218.1 |
| 2,898,620 | 12/1957 | Dickinson . | |
| 3,088,150 | 5/1963 | Sweeney | 15/106 |
| 3,188,674 | 6/1965 | Hobbs | 15/104.04 |
| 3,428,988 | 8/1967 | Blackburn . | |
| 3,629,895 | 12/1971 | Colgan . | |
| 3,784,999 | 1/1974 | Preston | 15/218.1 |
| 3,813,722 | 6/1974 | Sapochinik . | |
| 3,966,335 | 6/1976 | Abramson . | |
| 4,087,878 | 5/1978 | Grieshaber et al. . | |
| 4,104,758 | 8/1978 | Stotler . | |
| 4,301,567 | 11/1981 | Tucker | 15/104.04 |
| 4,439,884 | 4/1984 | Giorni . | |
| 4,872,235 | 10/1989 | Nielsen . | |
| 4,879,779 | 11/1989 | Zalevsky et al. . | |
| 5,094,557 | 3/1992 | Nelson | 15/104.04 |

FOREIGN PATENT DOCUMENTS

| | | | |
|---|---|---|---|
| 87803 | 8/1895 | Fed. Rep. of Germany | 15/160 |
| 367195 | 1/1923 | Fed. Rep. of Germany | 15/104.04 |
| 485940 | 11/1929 | Fed. Rep. of Germany | 15/218.1 |

Primary Examiner—Philip R. Coe
Assistant Examiner—Randall Edward Chin
Attorney, Agent, or Firm—Price, Gess & Ubell

[57] ABSTRACT

A fork scrubber is provided with zigzag bristles for effectively cleaning a utensil such as a fork or the like. The zigzag bristles are mounted within an oval tube into which a fork is inserted. The bristles are oriented perpendicular to the direction of insertion of the fork. As the fork is inserted, the zigzag bristles are pulled within slots between tines of the fork. Where the bristles provide sharp vertex points for scraping the inner edges of the tines. The bristles each have an oblong or rectangular cross-section having wide side surfaces. The wide side surfaces are oriented parallel to the direction of insertion of the fork to provide optimum resiliency. The fork scrubber thus provides a simple, inexpensive, and convenient tool for cleaning forks or other utensils having hard-to-reach places.

24 Claims, 4 Drawing Sheets

FORK SCRUBBER

BACKGROUND OF THE INVENTION

1. Field of the Invention

The invention relates generally to tools for cleaning household utensils.

2. Description of Related Art.

Over the years, a multitude of tools, machines, and methods have been devised for cleaning household utensils. However, heretofore no effective and inexpensive means has been devised for cleaning the common household fork. The reason is simple. The fork, with its alternating tines and slots, provides hard-to-reach inner edges on which food or other undesired matter adheres. Often, particularly in silverware of dubious quality, the inner edges of the fork tines are rough and uneven, thus allowing the food or other matter to adhere tenaciously. The narrower the slots of the fork, the more difficult it becomes to reach stubborn food remnants. Small, thin forks such as the fondue fork, the oyster fork, or the fish fork present an even more challenging cleaning problem.

Conventional cleaning tools and machines fail to provide adequate scrubbing force along the inner edges of the fork tines and along the root between the base of the tines, and thus fail to completely clean the fork.

As can be appreciated, there is a need to provide a simple, inexpensive, and reliable tool for fully cleaning a fork or similar utensil.

SUMMARY OF THE INVENTION

Therefore, it is an object of the invention to provide a tool for fully cleaning a fork or similar utensil;

It is another object of the invention to provide a tool for cleaning a fork which is simple, reliable, and inexpensively constructed from common materials; and It is a further object of the invention to provide a tool for cleaning the inner edges of fork tines and for cleaning the root at the base of the fork tines.

These and other objects of the invention are achieved by the provision of a utensil scrubber having a plurality of zigzag bristles extending from an interior wall of a tube or enclosure.

In accordance with a preferred embodiment, the enclosure is an oval cylindrical tube, and the zigzag bristles are mounted to, and extend from, an inner wall of the tube. The zigzag bristles are arranged in a plurality of rows and columns. Each individual bristle has an oblong or rectangular cross-section such that each bristle has opposing thin edges and opposing thick edges. The bristles are oriented with the thin edges facing the ends of the tube and with the thicker edges facing the sides of the tube. With this configuration, the resilience of the bristles is biased along the longitudinal axis of the tube such that optimum scraping force is achieved. One end of the tube is closed such that the tube may be filled with dishwater to further facilitate cleaning of the fork.

In an alternative embodiment, opposing sets of bristles are provided on opposing inner walls of the tube with the bristles intermeshing. Each set of bristles is mounted on a removable mounting member. Thus, the bristles are removable from the tube for cleaning. A ring is mounted over the open end of the tube to secure the mounting member within the tube when in use.

Both embodiments exploit the zigzag shape of the bristles to effectively clean the inner edges of the fork tines. Each zigzag bristle, as a consequence of its zigzag shape, includes a number of sharp vertex points. As the fork is inserted into the utensil scrubber, bristles are drawn within the slot of the fork. The vertex points of the zigzag bristles scrape against the inner edges of the fork tines, thus removing food material caked thereon. As the fork is further inserted into the utensil scrubber, the leading bristles are pulled against the root at the base of the tines of the fork, thus scraping and cleaning the root.

As noted above, each bristle is advantageously provided with an oblong or rectangular cross-section. Thick edges of the bristles lie parallel with the longitudinal axis of the tube along which the fork is inserted and removed. As a consequence, the bristles have greater resilience parallel to, rather than perpendicular to, the longitudinal axis. The greater resilience along the longitudinal axis assures optimum scraping force. Further, the greater resilience prevents the bristles from twisting while traversing the fork slots, to thereby maintain the sharp vertex points of the bristles against the inner edges of the fork tines. Additionally, the greater resilience assures that the bristles, after being stretched by insertion and removal of the fork, return to an upright position.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a utensil for cleaning a fork or the like.

Referring to FIGS. 1-6, a preferred embodiment of the invention will be described.

Figure 1:
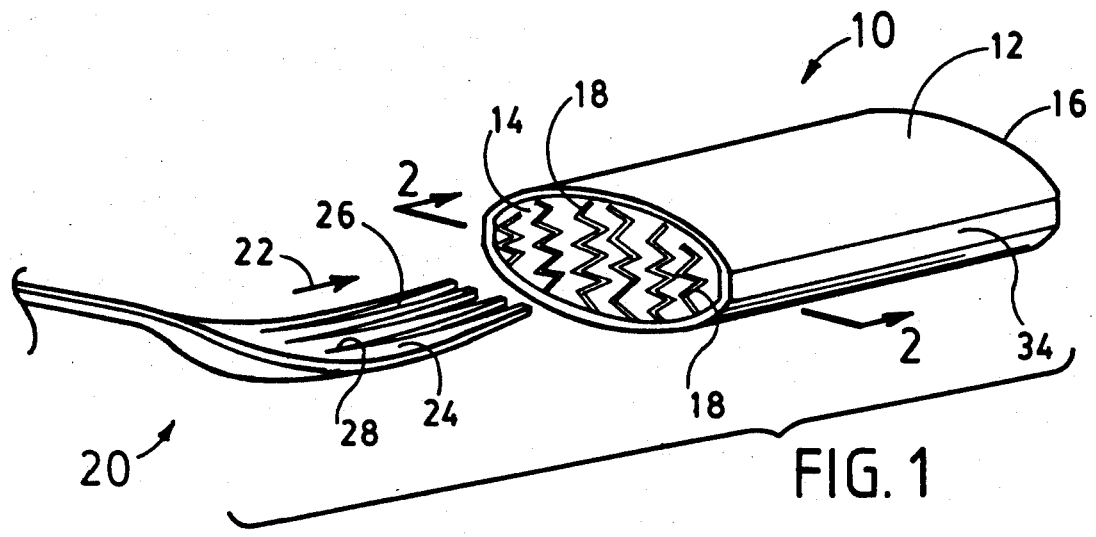
FIG. 1 is a perspective view of an embodiment of the invention showing a fork prior to insertion.

In FIG. 1, a fork scrubber 10 is shown. Fork scrubber 10 includes an enclosure or shell 12 formed in the shape of an oval cylindrical tube. Tube 12 includes an open end 14 and a closed end 16. A set of zigzag-shaped bristles 18 is mounted within the interior of tube 12 for scrubbing and cleaning a fork. An exemplary fork 20 is shown in FIG. 1 prior to insertion into fork scrubber 10. In use, fork 20 is inserted into open end 14, as shown by the direction of arrow 22. Within fork scrubber 10, zigzag bristles 18 scrape the surface of the tines or tangs 24 of fork 20.

As will be described more fully below, zigzag bristles 18 are oriented and configured to effectively clean fork 20 and, in particular, to scrape food or other matter from inner edges 26 of fork tines 24, and to effectively scrape root portion 28 formed at the base of fork tines 24.

Figure 2:
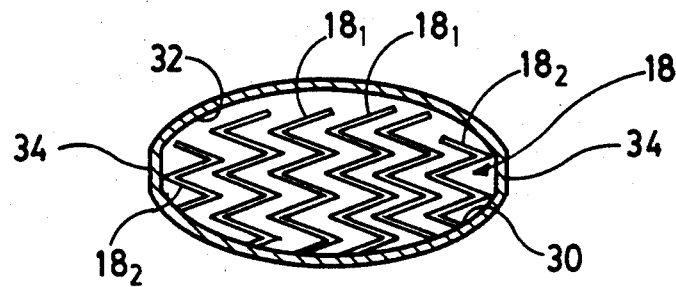
FIG. 2 is a cross-sectional view taken along line 2—2 of FIG. 1.

Referring to FIG. 2, a single row of zigzag bristles is shown. Bristles 18 are mounted to, and extend outward from, an inner wall 30 of tube 12. Each bristle extends perpendicular to a central or longitudinal axis of tube 12 along which fork 20 is inserted. Bristles 18 extend substantially across the inner opening of tube 12 toward opposing inner wall 32. In the embodiment shown in FIG. 2, bristles 18 are parallel with each other. Thus, in this embodiment, central bristles, individually designated $18_1$, extend perpendicular from inner wall 30. Edge bristles, individually designated $18_2$, are not perpendicular to inner wall 30, but are mounted at an angle slightly from the perpendicular to compensate for the curvature of inner wall 30, to thereby extend parallel with central bristles $18_1$.

Tube 12 has a generally oval cross-section. However, sides 34 of tube 12 are truncated.

Figures 3A, 3B:
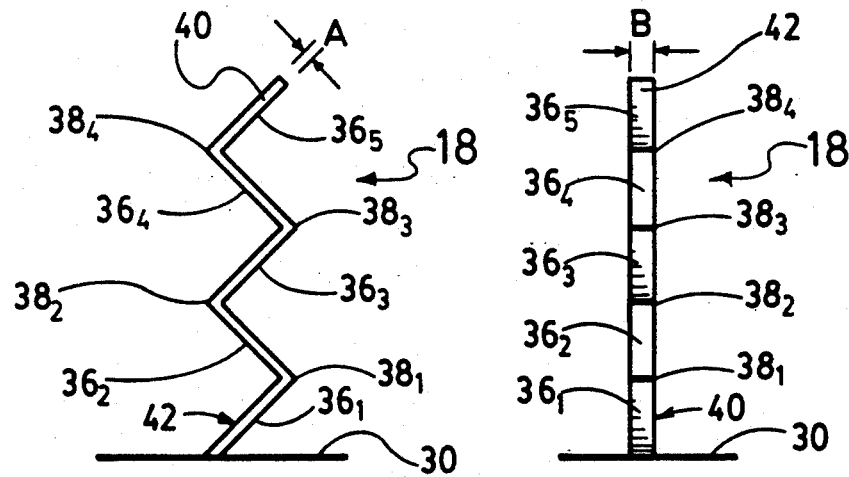
FIG. 3A is a front elevational view of an exemplary zigzag bristle of the embodiment of FIG. 1.
FIG. 3B is a side elevational view of the zigzag bristle of FIG. 3A.

Bristles 18 are formed from plastic or any other suitable material capable of forming a firm but resilient bristle moldable into a zigzag shape. Individual bristles 18 are molded within a plane to produce the zigzag pattern. In other words, bristles 18 have a flat zigzag shape rather than a corkscrew shape. The configuration of bristles 18 is best seen from a comparison of FIGS. 3A and 3B. FIG. 3A provides a front view of an exemplary bristle 18, and FIG. 5B provides a side view of the same bristle. Bristle 18 is molded to form a set of alternating legs or straight segments, generally denoted 36, connected by vertex or apex points, generally denoted 38. Legs 36 are molded at approximately 90-degree angles from each other such that vertex points 38 are sharp. All of the legs or straight segments of a respective bristle are formed in a single plane which extends through the respective bristle.

Also, as can be seen from FIGS. 3A and 3B, each bristle 18 has a generally rectangular or oblong cross-section. Bristle 18 has opposing thin sides 40 with width A and opposing thick sides 42 with width B. As will be discussed in further detail below, orienting the greater width B parallel to the direction of insertion of the fork ensures a greater resilient force opposing the direction of fork movement.

Figure 4:
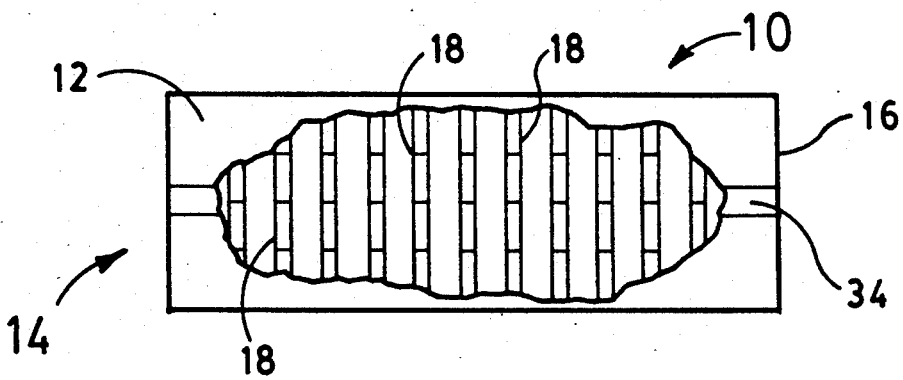
FIG. 4 is a side elevational view of the embodiment of FIG. 1 showing, in cutaway, the interior thereof.

Bristles 18 are aligned perpendicular to the direction of insertion of fork 20 with the plane of each bristle oriented perpendicular to a longitudinal axis of the tube. This is best seen in FIG. 4, showing a side view of fork scrubber 10 cut away to reveal several rows of bristles. Preferably, a total of 10 or 11 rows of bristles are provided, with each row having 5 to 6 individual bristles. The rows of bristles are equally spaced within tube 12, with each individual bristle being equally spaced in columns of bristles. Thus, a uniform grid of bristles is provided.

In use, a fork 20 is inserted into free end 14 of fork scrubber 10. Bristles 18 are pulled within and scraped against tines 26. Central bristles $18_1$ are drawn within the slots of the fork. Edges bristles $18_2$ are scraped against outer edges of the outermost tines of the fork. During, insertion, the bristles, particularly at vertex points 38, scrape inner edges 26 of fork tines 24. The zigzag configuration of the bristles provides sharp points for scraping the fork.

Figure 5:
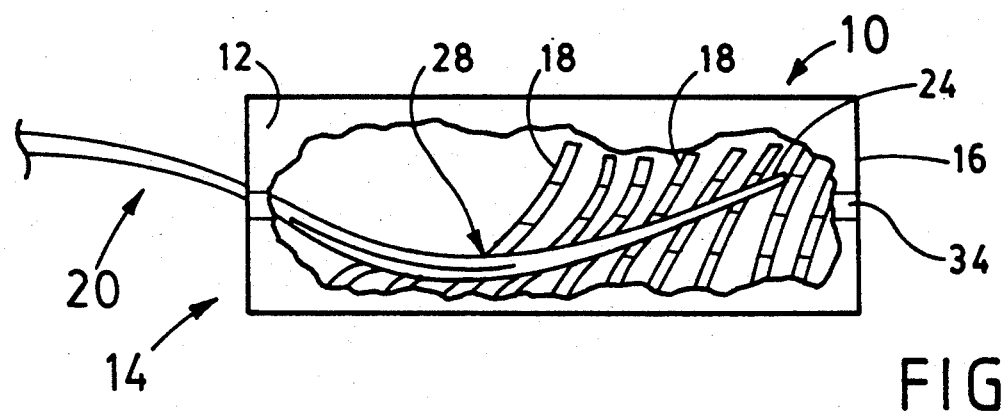
FIG. 5 is a side elevational view of the embodiment of FIG. 1 showing, in cutaway, the interior thereof, and showing a fork inserted therein.

As the fork is further inserted, bristles 18 of the leading row of bristles ultimately reach root portion 28 at the base of the tines of the fork. Continued insertion causes leading bristles to be resiliently bent in the direction of the movement of the fork (FIG. 5).

As shown by an exemplary bristle having three vertex points and four leg segments within FIGS. 6A-6D, leading bristles are successively pulled laterally through the slots, thereby scraping each of the vertex points past root 28 in succession.

Figure 6A:
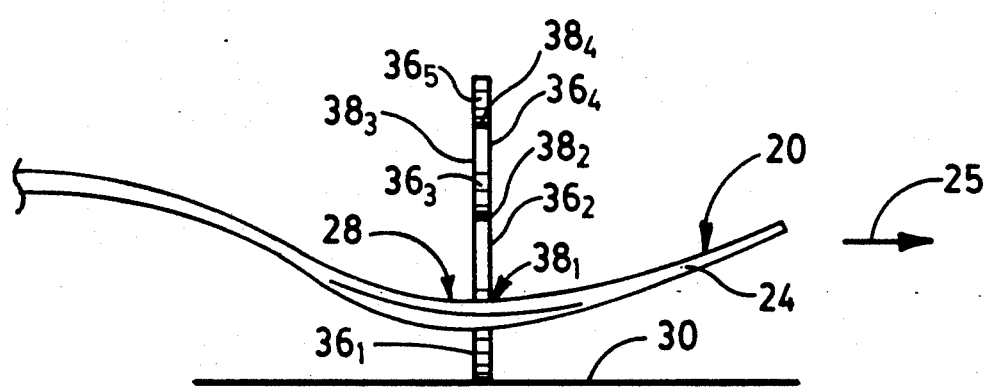
FIGS. 6A–6D provide a sequential side elevational view of an exemplary zigzag bristle traversing a slot within a fork.
Figure 6B:
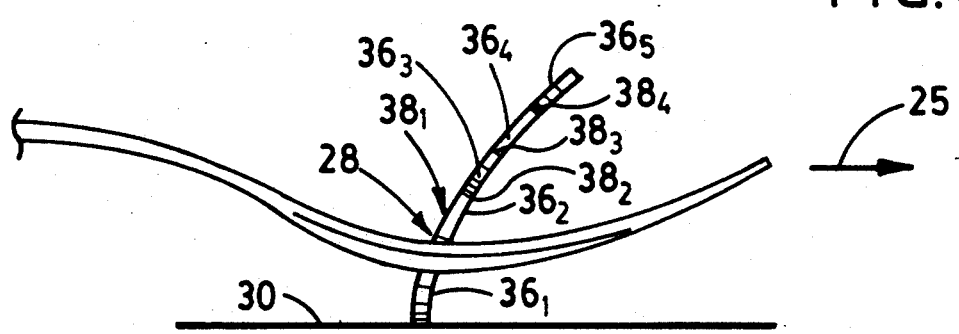
Figure 6C:
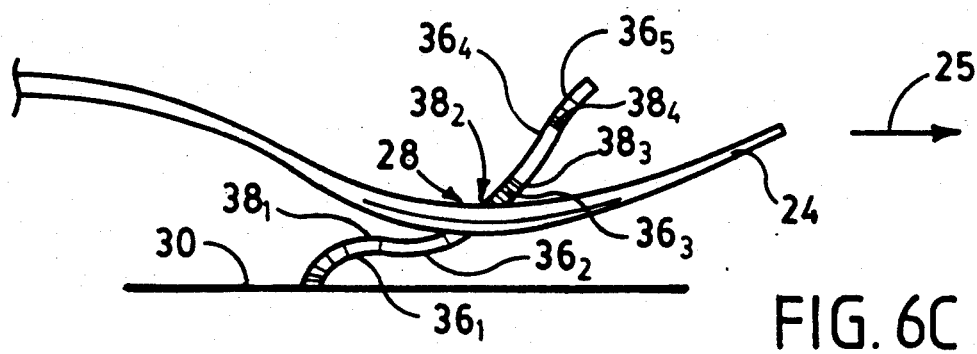

When fork 20 first enters fork scrubber 10, the tines of the fork initially engage a lower leg segment such as segment $36_1$ shown in FIG. 6A. During the initial scraping step of FIG. 6A, leg $36_1$ scrapes the inner edges of the fork tines. Lower vertex point $38_1$ remains above tines 24. The fork is further inserted in the direction of arrow 25 until bristle 18 reaches root 28 and begins to bend (FIG. 6B). Bending occurs because lower vertex point $38_1$ becomes hooked to fork tine 24 at root 28. As insertion continues, the resistance to insertion provided by vertex point $38_1$ is overcome, and vertex point $38_1$ is laterally pulled from top to bottom through fork tines 24 until vertex point $38_1$ is below fork tines 24, as shown in FIG. 6C. As vertex point $38_1$ is pulled past root 28, the sharp point of vertex point $38_1$, shown more clearly in FIG. 3A, effectively scrapes root 28.

Figure 6D:
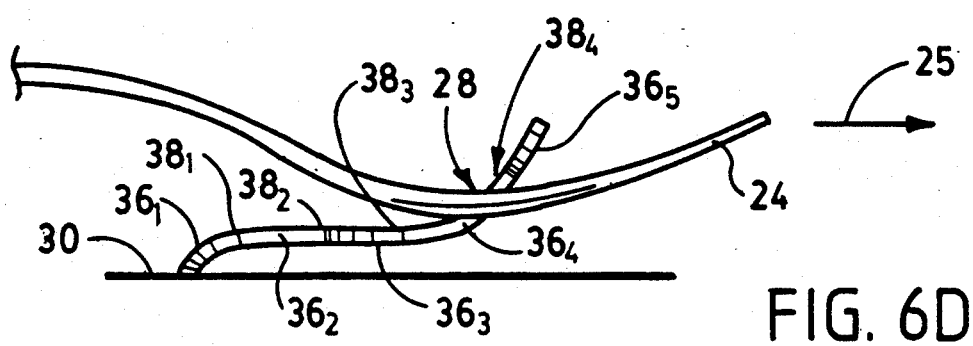

Once lower vertex point $38_1$ passes through fork tines 24, leg portion $36_2$ begins scraping root 28 until middle vertex point $38_2$ becomes hooked within root 28. At this point, shown in FIG. 6C, bristle 18 is further resiliently bent. Again, continued insertion of fork 20 overcomes resistance caused by root 28 being hooked within vertex point $38_2$ until vertex point $38_2$ is pulled past root 28 from above fork tines 24 to below fork tines 24. As vertex point $38_2$ is pulled past root 28, additional scraping occurs. Next, as insertion continues in the direction of arrow 25, leg segment $36_3$ scrapes against root portion 28. Finally, root 28 becomes hooked within upper vertex point $38_3$, as shown in FIG. 6D. Bristle 18 is even further resiliently bent in the direction of arrow 25. Although not shown in the sequence of FIGS. 6A-6D, continued insertion causes vertex point $38_3$ to be pulled through fork tines 24 past root 28.

Upper leg segment $36_4$ provides a final scraping surface. As no additional vertex points are provided, additional insertion along the direction of arrow 25 will cause bristle 18 to be pulled completely beneath fork 20 (not shown). Preferably, the interior dimensions of fork scrubber 10 are chosen such that, for a typical fork, further insertion beyond the step shown in FIG. 6D is blocked by end wall 16 (FIG. 1). Thus, leading bristle 18 is not pulled completely through fork tines 24. This configuration has the advantage that, when fork 20 is withdrawn from fork scrubber 10, leg segment 36₃ remains between fork tines 24 to provide additional scraping. Such would not be the case if bristle 18 were pulled completely through fork 20.

Although the scraping process has been shown with respect to a single exemplary leading bristle 18 in FIGS. 6A-6D, it should be understood that a large number of bristles are simultaneously drawn within fork tines 24 for scraping at various points along inner edges 26 (FIG. 5). Depending upon the interior dimensions of fork scrubber 10 and upon the size of the inserted fork, several of the leading rows of bristles may be drawn against root portion 28 and laterally pulled through fork tines 24, as with the exemplary bristle of FIGS. 6A-6D. In a configuration where no end wall 16 is provided, fork 20 can be pushed entirely through fork scrubber 10, causing each row of bristles in succession to be pulled through fork tines 24.

Thus, the zigzag shape of the bristles provides two scraping processes. First, as fork 20 is inserted, bristles 18 are drawn longitudinally within the slots to scrape inner edges 26 of fork tines 24. Second, once bristles 18 become hooked at roots 28, the bristles are pulled laterally through the slots past roots 28. This latter scraping effect occurs primarily in the vicinity of the root of the tines of the fork where the bristles become hooked against the root. However, if several rows of closely spaced bristles are provided, rows of bristles will become bunched together near root 28, as shown in FIG. 5. Consequently, bristles remote from root 28 may be laterally pulled through the slots, thus providing even more effective scraping along the inner edges of the tines of the fork.

Upon removal, bristles 18 remaining within the slots are again longitudinally drawn past fork tines 24 until fork 20 is completely removed from fork scrubber 10.

As seen in FIGS. 5 and 6A-6D, deflection of a bristle 18 is primarily along the direction of insertion of fork 20. The thicker sides (side B of FIGS. 3A-3B) of the rectangular cross-sectioned bristle are aligned parallel with the direction of insertion to bias the resilient force along the longitudinal axis of fork insertion.

The biasing of the resilience of the bristles afforded by the orientation of the bristles has several advantages. As a consequence of the orientation, once fork 20 is removed from fork scrubber 10, bristles 18 readily return to their original upright configuration (FIG. 4). Second, by biasing the resilient force, twisting of the bristles is minimized. Twisting can occur as bristle 18 scrapes inner edges 26 of fork tines 24. As bristle 18 traverses fork tines 24, excessive twisting of bristle 18 may prevent sharp vertex points 38 from effectively scraping inner edges 28 of the fork tines.

Even with the oblong cross-section, some twisting of bristle 18 may occur once the bristle becomes hooked within root portion 28 between the tines of the fork. Here, however, a certain amount of twisting is advantageous, since it assures that all points along the inner curved edge of root 28 are effectively scraped. However, excessive twisting of bristle 18, particularly within lower leg segment 36₁, may damage the bristle.

Preferably, bristles 18 are formed from a durable plastic, sufficiently resilient to allow bending, as shown in FIGS. 5 and 6A-6D, without breaking, but sufficiently rigid to assure a sharp scraping surface, particularly at vertex points 38. Preferably, bristles 18 are molded or cast within zigzag molds to produce a zigzag shape. Alternatively, zigzag bristles 18 are formed by folding or bending an ordinary linear bristle to produce a zigzag shape. The latter process is preferably performed with the bristle first heated to facilitate the folding or bending.

Tube 12 is preferably constructed from a sturdy, rigid, durable plastic. Bristles 18 may be heat molded to interior surface 30. Alternatively, any conventional means for securely mounting a bristle to a surface can be employed.

The provision of closed end 16 allows fork scrubber 10 to be filled with dishwater to facilitate cleaning.

Preferably, fork scrubber 10 has a width, measured between opposing side surfaces 34, of 2 inches, a depth, measured between ends 14 and 16, of 2¾ inches, and a height of 1 inch. Truncated sides 34 are ¼-inch wide. Tube 12 has a thickness of 1/10-inch. A typical bristle 18 has an unstretched length of ⅝-inch and a fully stretched length of 1178 inches.

In an alternative embodiment, tube 12 is formed from a resilient plastic such that the tube can be squeezed during insertion of a fork to press bristles 18 against fork 20, to thereby increase the scraping force of the bristles.

Another alternative embodiment of the invention is shown in FIGS. 7-11. The embodiment of FIGS. 7-11 is similar to the embodiment of FIGS. 1-6, and like elements are identified with like reference numerals with primes.

Figure 7:
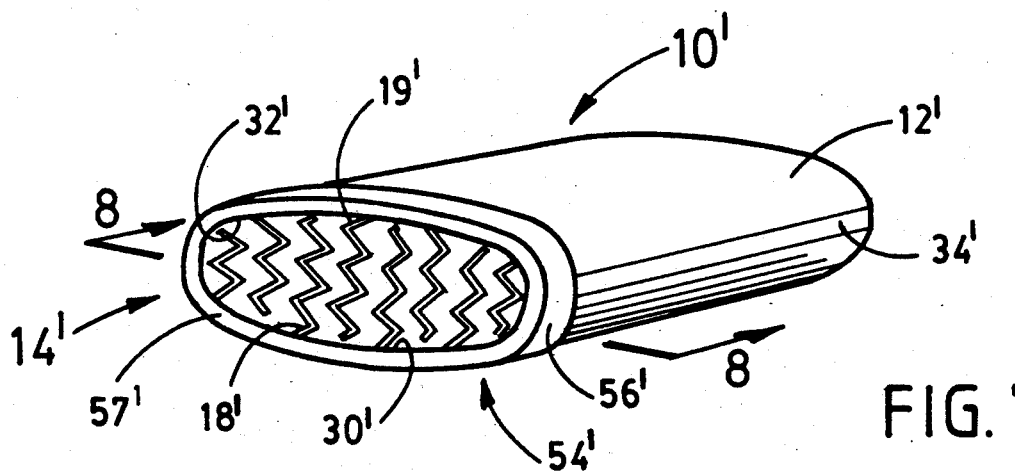
FIG. 7 is a perspective view of an alternative embodiment of the invention.

FIG. 7 provides a perspective view of alternative fork scrubber 10'. Fork scrubber 10' is similar to fork scrubber 10, except two sets of opposing intermeshed bristles are provided, the bristles are mounted to mounting plates for removal from fork scrubber 10', and a mounting ring is provided for securing the removable mounting plates within the fork scrubber.

As can be seen from FIG. 7, a first set of bristles 18' extends upward toward upper inner wall 32', and a second set of bristles 19' extends downward toward lower interior wall 30'.

Figure 8:
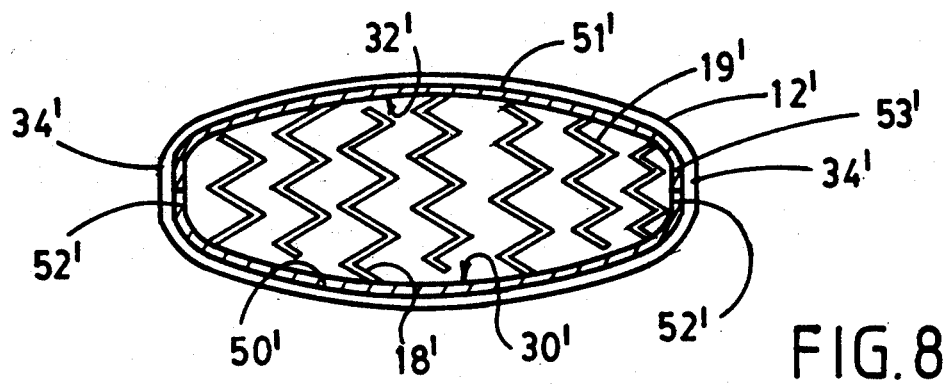
FIG. 8 is a cross-sectional view taken along line 8—8 of FIG. 7.

Opposing bristles 18' and 19' intermesh, as shown in FIG. 8. Lower bristles 18' are mounted to a lower curved mounting plate 50'. Upper bristles 19' are mounted to an upper curved mounting plate 51'. Mounting plates 50' and 51' are complementarily shaped to fit the inner surface of tube 12'. Mounting plates 50' and 51' each include edge flanges 52' and 53', respectively. Edge flange 52' and 53' is disposed adjacent to a side wall 34'. As can be seen from FIG. 8, flange portion 52' abuts flange portion 53' to thereby effectively secure both mounting plates adjacent to the inner walls of tube 12'.

Figure 9:
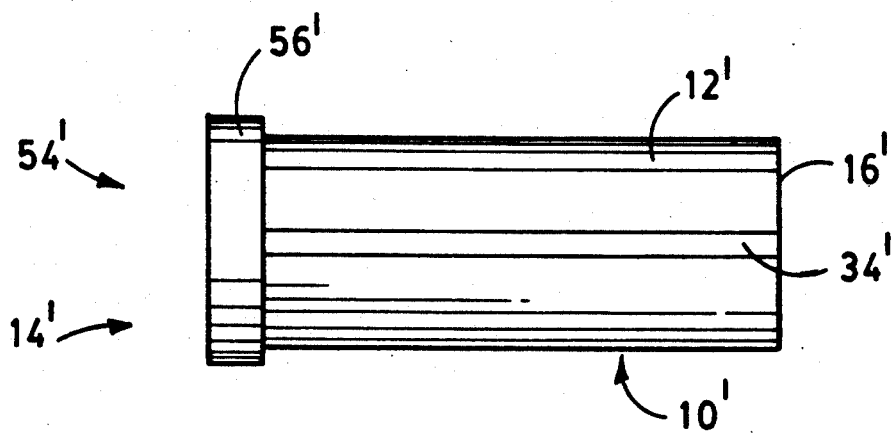
FIG. 9 is a side elevational view of the embodiment of FIG. 7.

A removable mounting ring 54', shown most clearly in FIGS. 7 and 9, is mounted to open end 14' to prevent the mounting plates from sliding out of the tube. Ring 54' is preferably constructed of a plastic material and includes an outer sleeve portion 56', which extends partially along the outer surface of tube 12 in the vicinity of end 14. Ring 54' also includes an inner annular portion 58', which extends circumferentially around opening 14' and partially blocks opening 14' to prevent the mounting plates from sliding out of the tube.

Figure 10:
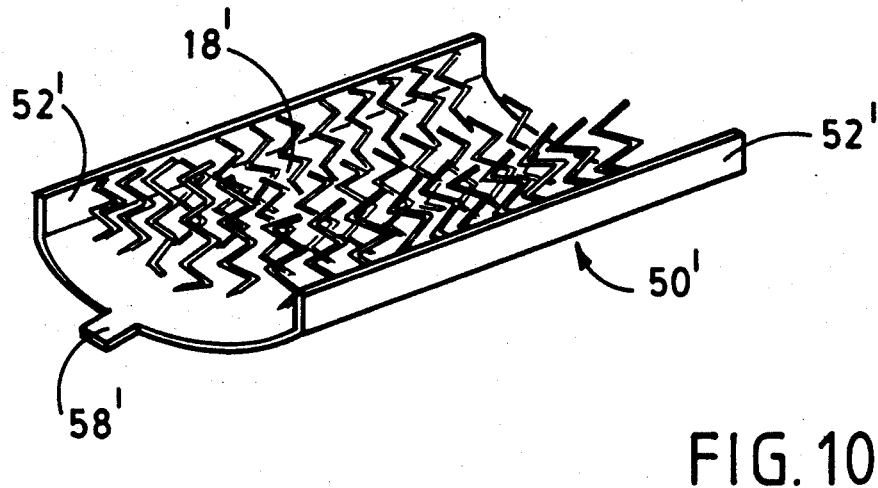
FIG. 10 is a perspective view of one of the removable bristle plates of FIG. 8.

Lower mounting plate 50' is shown, in FIG. 10, removed from tube 12'. Mounting plate 50' includes a tab 58' to facilitate manual removal of the bristles from the tube. Although not shown, upper mounting plate 51' includes a similar tab. Preferably, tab 58' is sufficiently small such that when mounting ring 54' is mounted to tube 12', tab 58' does not block or hinder ring 54'. This can be accomplished by providing ring 54' with a sufficiently long sleeve portion 56' to allow ring 54' to be mounted with annular portion 57' slightly offset from end 14' of tube 12'. Alternatively, although not shown, slots may be formed within ring 54' to receive tabs 58'.

Figure 11:
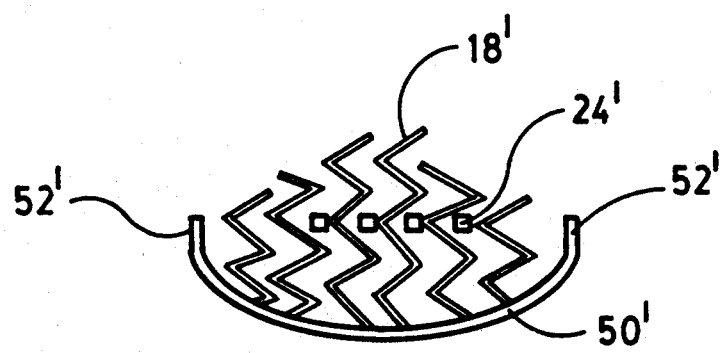
FIG. 11 is a front elevational view of an exemplary row of zigzag bristles showing, in cross-section, the tines of a fork interacting with the zigzag bristles.

In FIG. 11, the interaction of bristles 18' and fork tines 24' is shown in cross-section. Vertex points 38' scrape inner edges 26', as shown and described with reference to the embodiment of FIGS. 1–6.

The preferred external dimensions of the embodiment of FIGS. 7–11 is the same as that of the embodiment FIGS. 1–6. Sleeve portion 56' of cap 54' has a length of ½-inch. Annular portion 57' of ring 54' provides an aperture having a width of 1½ inches and a height of ½-inch.

Other than the differences mentioned, the embodiment of FIGS. 7–11 is similar to that of FIGS. 1–6, and similar materials and manufacturing methods are employed.

Although the zigzag bristles of the invention are shown and described as being mounted within an enclosed tube, the zigzag bristles can be mounted within any suitable enclosure or support. Thus, the oval tube shown in the drawings is merely one possible configuration. Other exemplary configurations include zigzag bristles mounted to a flat plastic plate or to the exterior of a curved implement. The tube embodiment described is preferred, in part, because the tube provides a convenient external surface for holding the tube and provides an inner enclosure for holding dishwater to facilitate cleaning.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A fork scrubber comprising:
   a tube having first an second opposing interior walls; and
   a plurality of substantially parallel zigzag bristles mounted to the first wall and having free ends extending toward the second wall, said zigzag bristles each having a plurality of segments connected by sharp vertex points.

2. The fork scrubber of claim 1, wherein the tube is substantially cylindrical.

3. The fork scrubber of claim 2, wherein the tube has an oval cross-section.

4. The fork scrubber of claim 1, wherein the bristles extend perpendicular to a longitudinal axis of the tube.

5. The fork scrubber of claim 4, wherein the bristles extend substantially from the first interior wall to the second interior wall.

6. The fork scrubber of claim 1, wherein one end of the tube is closed.

7. The fork scrubber of claim 1, wherein the tube is composed of a rigid material.

8. The fork scrubber of claim 7, wherein the tube is composed of plastic.

9. The fork scrubber of claim 1, wherein the bristles are 1/10-inch to 1/16-inch thick.

10. The fork scrubber of claim 1, wherein the plurality of bristles are formed in parallel rows and columns.

11. The fork scrubber of claim 10, wherein the rows are perpendicular to, and the columns are parallel to, a longitudinal axis of the tube.

12. The fork scrubber of claim 1, wherein the segments of each bristle are straight segments, and wherein all of the segments of a respective bristle are formed within a single plane extending through the respective bristle.

13. The fork scrubber of claim 12, wherein the planes of each of the zigzag bristles are oriented parallel with each other.

14. The fork scrubber of claim 13, wherein the plane of each respective zigzag bristle is oriented perpendicular to a longitudinal axis of the tube.

15. The fork scrubber of claim 14, wherein the tube has opposing ends and wherein each bristle has a pair of sides which face toward the opposing ends of the tube and a pair of side which face away from the opposing ends of the tube, and wherein each bristle has an oblong cross-section with the sides of the bristles facing toward the opposing ends of the tube being thinner than the sides of the bristles facing away from the opposing ends of the tube.

16. The utensil scrubber of claim 12, wherein adjacent segments of adjacent bristles are parallel.

17. The fork scrubber of claim 1, wherein a second set of substantially parallel bristles are mounted to the second interior wall and have free ends which extend toward the first interior wall of the tube with opposing bristles overlapping.

18. The fork scrubber of claim 1, wherein at least the first interior wall is removable from the tube.

19. The fork scrubber of claim 18, wherein the removable first interior wall includes a tab, the tab extending from an open end of the tube when the first interior wall is mounted within the tube.

20. The fork scrubber of claim 18, having means for securing the first interior wall within the tube.

21. The fork scrubber of claim 20, wherein the means for securing the first interior wall within the tube comprises a ring for positioning over an open end of the tube, the ring having a first portion extending partially along an outside surface of the tube, and a second portion for extending inward partially covering the open end to prevent the first interior wall from slipping out of the open end of the tube.

22. A fork scrubber comprising:
   a hand-holdable member having an interior side wall with opposing ends and a longitudinal axis and having a plurality of erect, resilient zigzag bristles extending outward from the interior side wall, the zigzag bristles being oriented parallel with each other and perpendicular to the longitudinal axis of the member, wherein each zigzag bristle has a plurality of straight segments connected by sharp vertices wherein the segments each have a pair of sides which face toward the opposing ends and a pair of sides which face away from the opposing ends and wherein each bristle has an oblong cross-section with the sides of the bristles facing toward the ends of the member being thinner than the sides of the bristles facing away from the ends of the member.

23. A utensil scrubber for cleaning a utensil such as a fork, the scrubber comprising:
   an cylindrical tube having an oval cross-section with first and second opposing interior walls, said tube having opposing ends including an open end and a closed end;

a plurality of substantially parallel bristles each having a zigzag shape and extending from the first interior wall toward the second interior wall; a plurality of substantially parallel bristles each having a zigzag shape extending from the second interior wall toward the first interior wall; the bristles extending perpendicular to a longitudinal axis of the tube and being oriented parallel with the open end; wherein each bristle has a pair of sides which face toward the opposing ends of the tube and a pair of sides which face away from the opposing ends of the tube, and wherein each bristle has an oblong cross-section with the sides of the bristles facing toward the ends of the tube being thinner than the sides of the bristles facing away from the ends of the tube, said first and second walls being removable from the tube; and a ring for positioning over the open end of the tube, the ring having a first portion extending partially along an outside surface of the tube, and a second portion for extending inward partially covering the open end to prevent the removable first and second interior walls from slipping out of the open end of the tube.

24. A utensil scrubber for cleaning a utensil such as a fork, the scrubber comprising:

a cylindrical tube having an oval cross-section with first and second opposing interior walls, said tube having opposing ends including an open end and a closed end;

a plurality of substantially parallel bristles each having a zigzag shape and extending from the first interior wall toward the second interior wall; a plurality of substantially parallel bristles each having a zigzag shape extending from the second interior wall toward the first interior wall; the bristles extending perpendicular to a longitudinal axis of the tube and being oriented parallel with the open end; wherein each bristle has a pair of sides which face toward opposing ends of the tube and a pair of sides which face away from the opposing ends of the tube, and wherein each bristle has an oblong cross-section with the sides of the bristles facing toward the ends of the tube being thinner than the sides of the bristles facing away from the ends of the tube.

* * * * *